United States Patent [19]
Baker

[11] 3,927,724
[45] Dec. 23, 1975

[54] LOAD CELL RETAINING APPARATUS FOR ON-BOARD VEHICLE WEIGHING SYSTEMS

[75] Inventor: Charles J. Baker, Portland, Oreg.

[73] Assignee: Royal Industries, Inc., Pasadena, Calif.

[22] Filed: Feb. 26, 1975

[21] Appl. No.: 553,132

[52] U.S. Cl. .............................. 177/136; 177/184
[51] Int. Cl.² ................. G01G 19/08; G01G 21/10
[58] Field of Search ............ 177/136, 138, 184, 211

[56] References Cited
UNITED STATES PATENTS

| | | | |
|---|---|---|---|
| 3,146,839 | 9/1964 | Carlson | 177/136 |
| 3,199,619 | 8/1965 | Hathaway | 177/136 |
| 3,279,550 | 10/1966 | Kersten | 177/136 |

Primary Examiner—George H. Miller, Jr.
Attorney, Agent, or Firm—Klarquist, Sparkman, Campbell, Leigh, Hall & Whinston

[57] ABSTRACT

Apparatus for retaining a load cell on the frame of a vehicle in an on-board vehicle weighing system, includes a horizontal base plate fixed on the vehicle frame. Fixed to the base plate are U-shaped retaining bars, having horizontal lip sections on their inner lateral surfaces which form horizontally extending channels between the base plate and the lips. A mounting plate fixed to the bottom of the load cell is supported on the base plate, the lateral edges of the mounting plate extending into the channels, the edges being sized to fit into the channels with horizontal and vertical clearance such that the load cell is retained on the vehicle's frame, but may shift to prevent application of distorting forces to the load cell.

11 Claims, 6 Drawing Figures

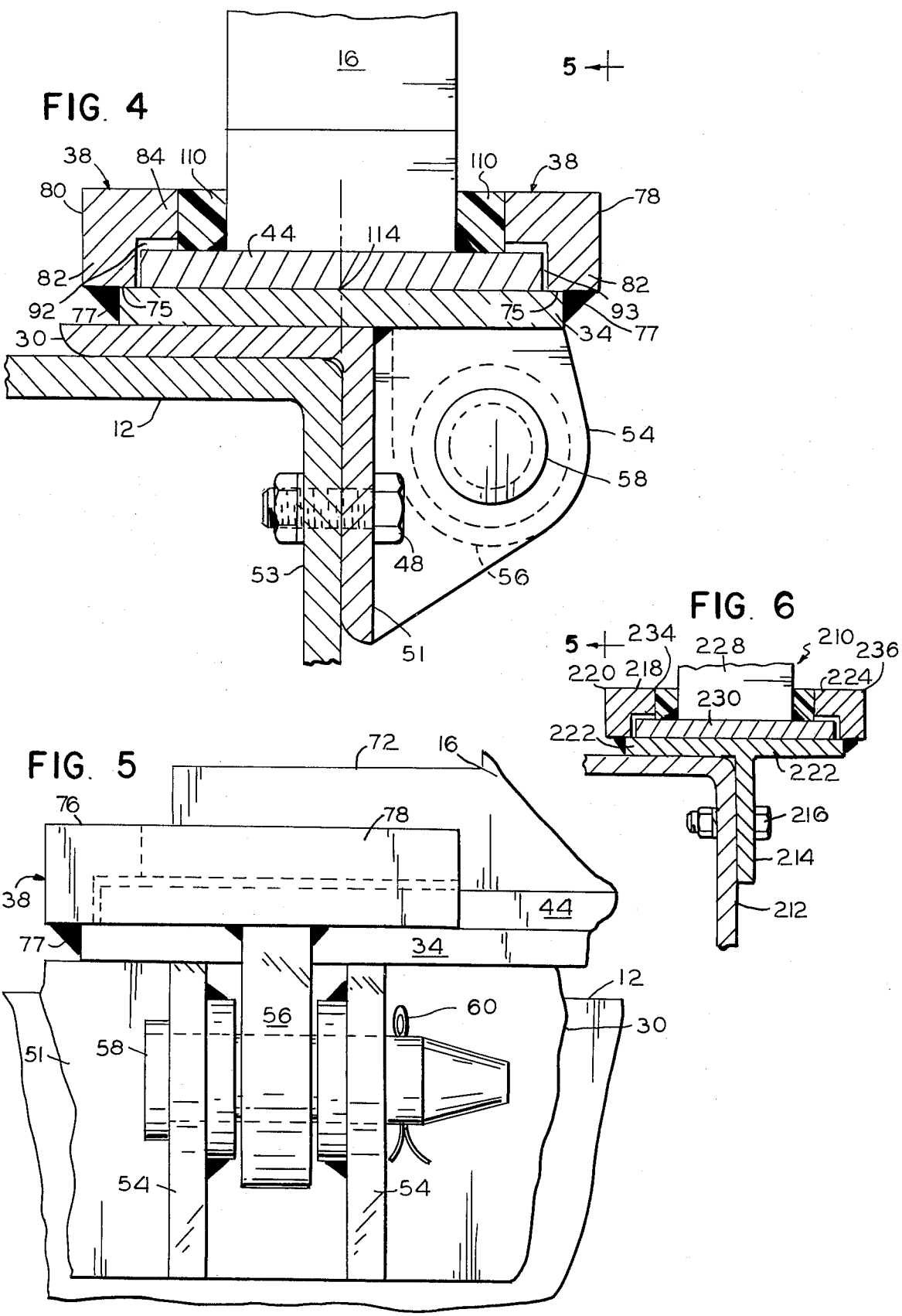

LOAD CELL RETAINING APPARATUS FOR ON-BOARD VEHICLE WEIGHING SYSTEMS

BACKGROUND OF THE INVENTION

The present invention relates to apparatus for use in on-board, electronic vehicle weighing systems. More particularly, the present invention relates to apparatus for retaining electronic load cells on the frame of a load carrying vehicle. In one aspect, the present invention relates to apparatus for eliminating or reducing distorting torsional forces on load cells in on-board weighing systems.

On-board weighing systems are built directly into load carrying vehicles such as trucks so that the weight of a load in a vehicle may be readily determined without resort to drive-on scales.

The electronic load cells used in electronic on-board weighing systems are well known. One suitable, conventional electronic load cell is described in U.S. Pat. No. 3,661,220, assigned to Electro Development Corporation, Lynnwood, Wash. Another suitable cell is the SI-100 load cell manufactured by Structural Instruments Co., Inc., Tukwila, Wash.

On-board weighing systems using electronic load cells have found particular acceptance in log hauling trucks, since it is difficult, by estimation, to load log trucks accurately to their maximum loaded weight.

In log hauling trucks the front end log holding or bunk assembly is supported upon the truck frame, which is conventionally formed from two parallel, longitudinal frame beams, extending back from the truck cab. Heretofore, load cells have been rigidly secured, as by welding, in position between the frame beams and the bolster or bridge beam upon which the bunks are mounted. Because of this rigid mounting severe stresses and strains have been imposed upon the load cells, resulting in their improper functioning and also frequently causing damage to the load cells.

SUMMARY OF THE INVENTION

It is an object of the present invention to prevent weight readout inaccuracies in on-board, electronic weighing systems.

It is another object of the present invention to prevent or reduce torsional stress and strain forces on electronic load cells employed in on-board vehicle weighing systems.

It is a further object of the present invention to provide load cell retaining apparatus for increasing the useful life of load cells in on-board vehicle weighing systems.

It is a further object of the present invention to provide load cell retaining apparatus allowing accurate calibration and adjustment of electronic on-board vehicle weighing systems.

More particularly it is an object of the invention to provide a mounting arrangement for a load cell that permits shifting of the latter a sufficient amount, when under torsional or other load strains, that injury to the load cell is prevented.

In accordance with the invention, a load cell of the type having a rectangular, box like body is fastened, as by welding, to the top of a rigid metal mounting plate. A pair of such cells are secured one to each end of the bolster of a log bunk. The cells are positioned upon the opposite frame members of a log bunk so that the load carried by the bunk is imposed on the frame member through the load cells. The cells are retained in position on the frame member by retainers mounted on a base plate secured to the frame members, the retainer defining channels receiving the edge portions of the mounting plate with sufficient clearance that the mounting plate may slide laterally and longitudinally within the channels by a slight amount and also tip slightly laterally or longitudinally relative to the base plate. Such sliding or tipping permits sufficient accommodation of the load cell to torsional strains imposed thereon to prevent injury to the load cell.

One primary advantage of the present load cell retaining apparatus resides in its facilitation of accurate weighing of loads in log trucks at sloped and inclined loading locations. Another advantage resides in the easy replacement of load cells.

DRAWINGS

FIG. 1 of the attached drawings is a fragmentary perspective view of a log truck frame and log holding assembly showing the electronic load cell mounting arrangement of the present invention;

FIG. 4 is an enlarged fragmentary sectional view taken along lines 4—4 of FIG. 1;

FIG. 5 is a partial side view of the apparatus shown in FIG. 4; and

FIG. 6 is a sectional view on a reduced scale of another embodiment of the present invention at the same section as shown in FIG. 4.

DETAILED DESCRIPTION OF THE INVENTION

Figure 1:
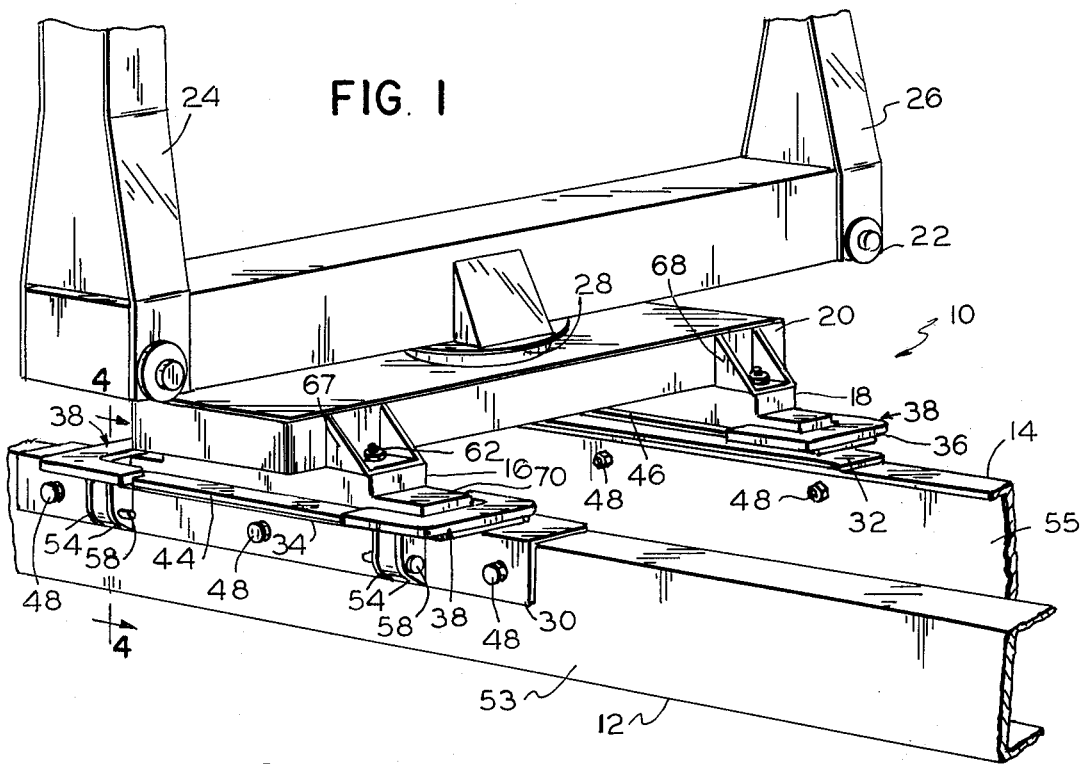

The retaining apparatus is especially useful for retaining load cells on log truck frames below the front end bunk assembly where damaging stresses to load cells most frequently occur and thus the invention is illustrated in such an environment. Referring to FIG. 1, indicated at 10 is the front end log carrying or bunk assembly of a log hauling truck. Assembly 10 is supported on two parallel, longitudinal truck frame beams 12 and 14. Two conventional load cells 16 and 18 are mounted on frame beams 12 and 14 under a transversely running bolster, or bridge beam, 20. A conventional log carrying log bunk 22 on stakes 24 and 26 are supported over the center top portion of bolster 20 by means of turntable 28, which allows bunk 22 and stakes 24 and 26 to rotate with respect to bolster 20.

Load bearing plates such as angle irons 30 and 32, fixed onto frame beams 12 and 14, respectively, serve to reinforce beams 12 and 14 at the points where the load is transmitted to beams 12 and 14. Two longitudinally elongated, rectangular base plates 34 and 36 extend over the top of the angle irons 30 and 32, respectively, and are secured thereto by means to be described hereinafter. Two U-shaped retainer bars 38 (see FIG. 2), also to be described in more detail hereinafter, are welded to opposite longitudinal ends of base plate 14. Likewise, retainer bar 38 and another identical retainer bar (not shown) are welded to opposite longitudinal ends of base plate 36. A rectangular mounting plate 44 is fixed as by welding to the bottom of load cell 16 (which is provided with conventional mounting extensions 70, 72) and has its edges emplaced beneath retainer bars 38 (see FIG. 4). Mounting plate 44 is supported by base plate 34 but is slidable thereon, as described in greater detail below. A mounting plate 46 is fixed to the bottom of load cell 18, and is slidably supported on base plate 36 with its edges engaging in the same manner beneath the retainer bars 38 secured thereto.

Angle iron 30 is secured to frame beam 12 by three bolts 48, extending through a flange 51 of the angle iron and the web 53 of the beam 12, and angle iron 32 is fixed to web 55 of frame beam 14 in a like manner. The base plate 34 is removably secured to the angle iron 30. Extending outwardly from the flange 51 are two pairs of brackets 54 adapted to receive ears 56 projecting downwardly from the plate 34, the brackets and ears having openings for receiving pins 58 held in place by a keeper pin 60. Base plate 36 is fixed to angle iron 32 in like manner.

Figure 3:
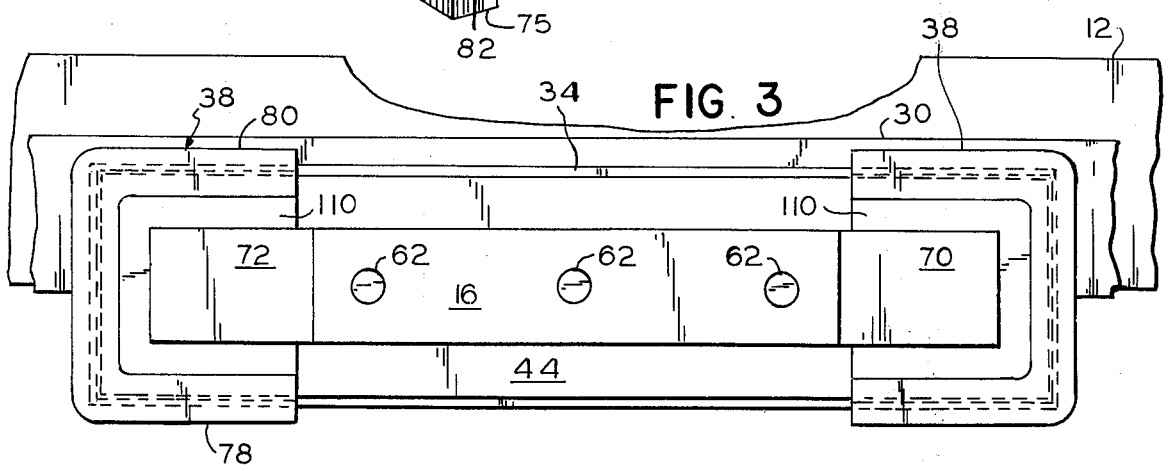
FIG. 3 is a plan view of a load cell positioned in the retaining apparatus of the present invention.

Load cell 16 is fastened to bolster 20 near one end thereof by means of integral studs 62 on the cell (see FIG. 3), secured by suitable nuts to a bolster bracket 67. In a similar manner load cell 18 is secured to bolster bracket 68 near the opposite end of bolster 20. Preferably the load cells 16, 18 are positioned so that their longitudinal center lines lie in or closely adjacent to the plane of the outer face of the frame webs 53, 55 respectively, whereby minimum deflection of frame members 12, 14 will occur under load cells 16, 18.

Figure 2:
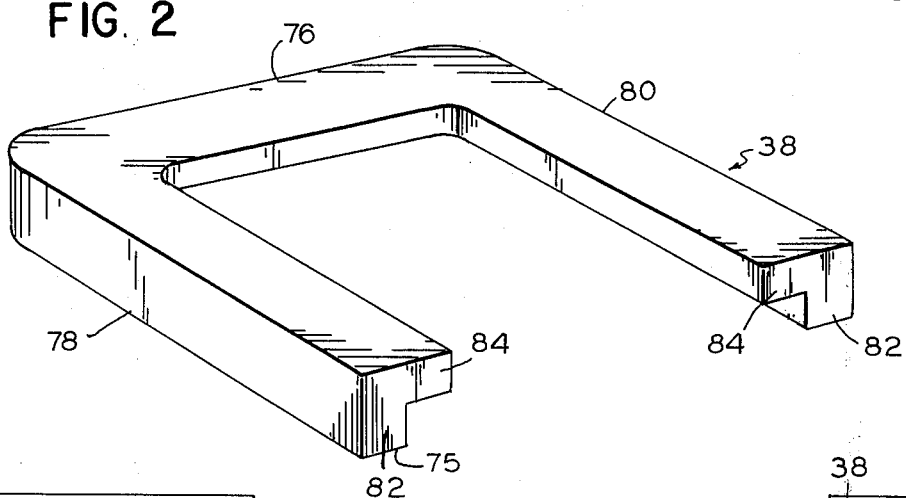
FIG. 2 is a perspective view of the retainer bar apparatus of the present invention.

Referring now to FIG. 2, the retainer bars 38 are inverted L-shaped cross section. Each is formed with a flat bottom surface 75 which overlaps and engages the upper surface of a base plate. The bars 38 are welded to the base plates such as plate 34 along the edges of the plates as indicated by weld bead 77 in FIG. 4. Retainer bars 38 each include a transversely extending connecting section 76, from which two parallel arm sections 78 and 80 extend horizontally at right angles. Sections 76, 78, 80 are each formed with a lower base portion 82 and with inwardly extending lips 84, which extend over the adjacent edge portions of a mounting plate such as plate 44, the lips defining channels 90 for receiving such edge portions.

As best shown in FIG. 4, the mounting plate 44 and cooperating retainer bars 38 are dimensioned so as to provide a vertical clearance space 92 between the bars and the plate and a side clearance space 93 between the bars and the side edges of the plate 44. Preferably the vertical clearance 92 between the lips 84 and the plate 44 is of the order of one-eighth inch and the plate 44 is preferably of a width such that a total clearance of one-eighth inch is present between the side edges thereof and the base portions 82 of the arm sections of bar 38 and of a length such that a similar clearance occurs between the end edges thereof and the base portions of the connecting sections of the bars 38. Thus, when centered plate 44 will have a clearance space 93 of one-sixteenth inch between each side edge, and a similar clearance space between each end edge and the adjacent bar base portion 82.

As shown in FIG. 4, the space 110 between the lips 84 and load cell 16 is preferably filled with a resilient silicon sealer to prevent entry of dirt or other foreign matter.

Logs carried on log bunk 22 exert strong forces through turntable 28 to bolster 20, which, because of its rigidity and stiffness, transmits the forces directly to load cells 16 and 18. When load cells are rigidly retained by welding or bolting them to truck frames as they have been heretofore, they are subject to injurious torsional stresses for which the cells were not intended. As a result load cells were frequently rendered wholly inoperative or damaged so as to give inaccurate readings.

In the arrangement of the present invention described above, under normal loading mounting plate 44 rests on base plate 34 and loads imposed on the bunk 22 will be passed through the bolster 20 vertically downwardly through the load cells 16, 18 to the truck frame. The weight imposed on the load cells 16, 18 can be determined in a known manner. In the event torsional forces are imparted upon the load cells 16, 18 as might occur, for example, when a truck is loaded when on a grade or uneven ground, the cells 16, 18 can shift or tilt by reason of the latitude of movement of mounting plate 44 with respect to base plate 34. While the amount of shifting permitted is not great, it is sufficient generally to avoid the injury or destruction to the load cells which would occur if they were rigidly secured to the truck frame. Mounting plate 44 also serves, of course, to reinforce load cell 16 against torsional distortion. However, should a load cell or any portion of its mount become damaged, the entire load cell assembly can be easily replaced by unbolting the cell from the bracket 67 and removing the pins 58.

In FIG. 6 there is shown an alternative embodiment 210 of the invention, employing a different supporting base for the apparatus. In embodiment 210, a vehicle frame is represented by conventional truck frame beam 212, to the web of which a T-bar 214 is secured by means of bolts 216. The arms 218, 224 of a U-shaped retainer bar 220, identical to retainer bar 38 shown in FIG. 2, are welded to the edges of the flange 222 of T-bar 214.

A load cell 228 is secured to a rectangular mounting plate 230, the edges of which extend into the channels defined by the lips 234, 236 of the arms 218, 224. Thus, in this embodiment the flange 222 of T-bar 214 is employed as a supporting base for the retaining apparatus. This embodiment otherwise functions in the same manner as that first described above.

The preferred embodiments of the retaining apparatus of the present invention having been described, variations and equivalents of the elements thereof will be apparent to those skilled in the art.

I claim:

1. Apparatus for retaining an electronic load cell on the frame of a load carrying vehicle in an on-board weighing system in said vehicle, which comprises in combination:

a supporting base on said vehicle frame defining an upwardly facing, generally horizontally extending base surface for supporting said load cell;

a load cell;

a rigid load cell mounting plate fixed to a bottom portion of said load cell having a generally horizontally extending bottom surface adapted for normally resting on said base surface to support said load cell thereon; and retainer means operatively arranged between said supporting base and said mounting plate permitting vertical and lateral movement of said mounting plate by a predetermined amount relative to said supporting base but positively restraining said plate from movement beyond said predetermined amount.

2. Apparatus as defined in claim 1 wherein said supporting base comprises an upper surface portion of a T-shaped bar fixed to a vehicle frame.

3. Apparatus as defined in claim 1 wherein said supporting base includes a horizontally disposed base plate fixed upon an upper surface portion of a vehicle frame, said base surface comprising an upper surface of said base plate.

4. Apparatus as defined in claim 3 wherein a portion of said base plate extends laterally outward from said upper surface portion of said vehicle frame.

5. Apparatus as defined in claim 3 wherein said base plate is removably fixed to said vehicle frame.

6. Apparatus as defined in claim 1 wherein said mounting plate includes a rigid edge section extending horizontally outwardly from said bottom portion of said load cell, said retainer means is fixed on an edge portion of said base surface to define a retaining channel extending around at least a portion of the edge of said base surface, and an outer edge portion of said mounting plate edge section extends into said channel, said retainer means having predetermined clearance with respect to said mounting plate, whereby the latter has limited free movement with respect to said base both horizontally and vertically.

7. Apparatus as defined in claim 2 wherein said edge section of said load cell mounting plate includes a generally horizontal top edge surface and a generally vertical outer edge surface, said retainer means having a side wall adjacent said vertical surface and a lip extending over said horizontal surface.

8. Apparatus as defined in claim 2 wherein said retainer means comprises a rigid bar of inverted L-shaped cross section defining horizontally extending bottom surface adapted to at least partially rest on said base surface, said bar having a base portion defining a vertical surface portion and having a lip extending horizontally from said base portion, said base portion and said lip defining said channel.

9. Apparatus as defined in claim 8 wherein said base surface is generally rectangular and said bar is generally U-shaped, said bar comprising two parallel arm sections extending horizontally at right angles from a connecting section, said bar being adapted to at least partially rest upon an edge portion of said base surface at a longitudinal end of said base surface with said arm sections at least partially resting upon longitudinally extending edge portions of said base surface and said connecting section at least partially resting upon a transversely extending edge section of said base surface to define a generally U-shaped channel at said longitudinal end of said base surface.

10. Apparatus for retaining an electronic load cell on the frame of a log truck for use in an on-board weighing system in said truck, which comprises in combination:
  a pair of horizontally disposed, parallel frame beams having generally vertical lateral web faces, positioned longitudinally on said truck;
  a pair of longitudinally elongated, reinforcing angle bars mounted one on each said frame beam by a vertically extending section on each said angle bar, said vertical section defining a generally vertical, lateral angle bar surface, and each said angle bar including a horizontal section extending one over each said frame beam defining a generally horizontal top angle bar surface;
  four pairs of brackets, two pairs thereof being fixed on said lateral surface of each said angle bar;
  a pair of longitudinally elongated, rectangular base plates positioned horizontally one on each said top angle bar surface, each said base plate having the longitudinal center line thereof lying substantially in the plane of one said web beam face, and each said base plate extending laterally from the plane of said lateral angle bar surface to define a horizontal base plate bottom surface;
  four ears fixed two to each said base plate extending downward from each said base plate bottom surface, positioned one in each said pair of brackets;
  four pins for removably securing said ears within said brackets;
  a pair of load cells each having studs extending upwardly from the top side thereof;
  a pair of longitudinally elongated, rectangular mounting plates welded one on the bottom end of each said load cell, each having the bottom surface thereof normally resting on the top surface of one said base plate;
  four U-shaped retaining bars each having an inverted L-shaped cross-section formed from an upper, inwardly extending lip and a lower base portion having a flat bottom surface overlapping and engaging an upper surface of one said base plate at a longitudinal end thereof, each said retaining bar being welded onto one said base plate longitudinal end and each said lip extending horizontally over an adjacent edge portion of one said mounting plate;
  each said lip and each said base plate longitudinal end defining a channel for receiving said adjacent mounting plate edge portion, said retainer bars and said mounting plates being dimensioned to provide a vertical clearance space of predetermined amount between each said lip and an upper surface of each said mounting plate and to provide a side clearance space of predetermined amount between said lower base portions and a side surface of each said mounting plate;
  a bolster beam fixed transversely between said top sides of said pair of load cells and attached to said load cells by said studs;
  a log bunk positioned above said bolster beam; and
  a turntable operatively connecting said log bunk to said bolster beam.

11. Apparatus for retaining an electronic load cell on the frame of a log truck for use in an on-board weighing system in said truck, which comprises in combination:
  a horizontally disposed frame beam having a generally vertical web face, positioned longitudinally on said truck;
  a longitudinally elongated T-bar mounted on said frame beam with the web of said bar abutting and parallel to said beam face and with the flange of said bar extending horizontally over said frame beam and defining a generally horizontal top surface;
  a load cell having a longitudinally elongated, rectangular mounting plate secured to the bottom side of said load cell, said plate having the bottom surface thereof normally resting on said T-bar flange surface;
  a pair of U-shaped retaining bars of inverted L-shaped cross-section formed from an upper, inwardly extending lip and a lower base portion secured to said T-bar flange surface at the opposite ends of said flange, said lips extending horizontally over an adjacent edge portion of said mounting plate;
  each said lip and said T-bar flange defining a channel for receiving the adjacent mounting plate edge portion, said retainer bars being dimensioned to provide a vertical clearance space of predetermined amount between each said lip and the upper surface of said mounting plate and to provide a side clearance space of predetermined amount between said lower base portions and a side surface of each said mounting plate whereby the latter may slide upon said flange within the limits of said clearance; log holding means on said truck, and means operatively connecting said log holding means to said load cell so as to impose on said load cell at least part of the load carried by said log holding means.

* * * * *

UNITED STATES PATENT AND TRADEMARK OFFICE
CERTIFICATE OF CORRECTION

PATENT NO. : 3,927,724
DATED : December 23, 1975
INVENTOR(S) : CHARLES J. BAKER

It is certified that error appears in the above-identified patent and that said Letters Patent are hereby corrected as shown below:

Column 5, Claim 7, line 23 - "2" should be --6--.

Column 5, Claim 8, line 29 - "2" should be --6--.

Signed and Sealed this ninth Day of March 1976

[SEAL]

Attest:

RUTH C. MASON
Attesting Officer

C. MARSHALL DANN
Commissioner of Patents and Trademarks